United States Patent [19]

Satzinger

[11] 3,958,812

[45] May 25, 1976

[54] PARTIALLY SELF-FASTENING, HIGHLY EFFECTIVE THREE-POINT SAFETY BELT FOR THE OCCUPANTS OF VEHICLES

[76] Inventor: Roland Satzinger, Hammelburger Strasse 21 a, D-8731 Euerdorf, Germany

[22] Filed: Feb. 10, 1975

[21] Appl. No.: 548,853

[30] Foreign Application Priority Data
Feb. 18, 1974 Germany............................ 2407757

[52] U.S. Cl................................. 280/746; 297/389
[51] Int. Cl.²......................................... B60R 21/02
[58] Field of Search.............. 280/150 SB; 297/389, 297/385, 388

[56] References Cited
UNITED STATES PATENTS
2,864,437  12/1958  Spring.................................. 297/389
3,815,934  6/1974  Weststrate..................... 280/150 SB

*Primary Examiner*—Robert R. Song
*Attorney, Agent, or Firm*—Burgess, Dinklage & Sprung

[57] ABSTRACT

An improvement in a safety belt system for use in a moving vehicle comprising a lap belt and a shoulder belt interconnected and provided with at least one lock half which lock half is engaged by a reciprocating lock half, said lap belt and said shoulder belt disposed to overlie a passenger seated on a seat of said vehicle, which improvement comprises a tensioned strap connected to the vehicle at one end and to the safety belt system on the other end proximate the junction of said lap belt and said shoulder belt, said lap belt and said shoulder belt being held by said tensioned strap above the horizontal plane of said vehicle.

14 Claims, 3 Drawing Figures

PARTIALLY SELF-FASTENING, HIGHLY EFFECTIVE THREE-POINT SAFETY BELT FOR THE OCCUPANTS OF VEHICLES

BACKGROUND OF THE INVENTION

Field of the Invention

This invention relates to a safety belt system for use in moving vehicles. More particularly, this invention relates to a safety belt system having a lap belt and a shoulder belt and thereby constituting a three-point safety belt system for use particularly in automobiles which system inhibits the circumvention of the use of the seat belt.

DISCUSSION OF THE PRIOR ART

Three-point safety belt systems and automatic belts are long known. However, they are far too complicated and are somewhat inefficient since usually they have to be grasped and pulled all the way around the body. Conventionally the three-point belt comprises a lap belt and a shoulder belt disposed on an inertia roller which belts are interconnected at a lock half. In use the operator or passenger will extend his hand toward the lock half which protrudes above a casing encompassing the roll on which one of the belts is disposed. The operator or passenger then brings the belt from the rolled position by one large sweep across his body to the point where the lock engages a reciprocating lock. This is a cumbersome operation.

Self-fastening belts are also known, but they are directly fastened to the vehicle body. Additionally, they are too expensive and ineffectual since they cannot be disposed in the optimum manner due to circumstances dependent upon the vehicle body design.

In recent years systems have been provided which preclude the movement of the automobile or at least cause an annoying alarm to sound if a seat is occupied without engagement of the seat belt. It was quickly discovered, however, that seat belt use could be avoided without inhibiting the vehicle's movement or incurring the annoying sound of the alarm if the lock was interconnected before the passenger entered upon the seat. Since by engaging the lock halves together would complete the required circuit the passenger could safely alight upon the seat without inhibiting the vehicle movement or causing the alarm to go off.

It therefore became desirable to solve those problems heretofore encountered and to provide a highly effective seat belt system wherein use of the seat belt could not readily be avoided. It furthermore became desirable to provide a uniform and optimum fastening of the belt with the seat in any position. Additionally it became desirable to provide a seat belt system wherein the handling of the seat belts could be performed by a simple mechanism wherein movement of the belt completely across the body in one large continuous path was unnecessary.

SUMMARY OF THE INVENTION

The problems heretofore encountered are solved by the present invention which resides in a safety belt system for use in a moving vehicle comprising a lap belt and a shoulder belt interconnected and provided with at least one lock half which lock half is engaged by a reciprocating lock half, said belt and shoulder belt being disposed to overly a passenger seated on a seat of a vehicle. The safety belt system is improved, according to the present invention, by a tensioned strap connected to the vehicle at one end and to the safety belt system on the other proximate the junction of the lap belt and the shoulder belt, the lap belt and the shoulder belt being held by the tensioned strap above the horizontal plane of the vehicle seat.

Therefore, the problems of the present invention are solved by affixing the shoulder belt and the lap belt, at the belt lock half or adjacent thereto, to one end of a tensioned cord or strap which is tensed by means of a spring force, compressed air or rubber bungee and which on the other end is attached to the vehicle body. This tensioned cord or strap can be affixed at any number of places in the vehicle body depending upon whether the safety belt system is applied to a front seat or a rearward seat.

When applied to a front seat generally the tensioned cord or strap is affixed to the vehicle body in the region of the dashboard or the front door post or especially in the region formed by the corner of the dashboard and the door post. This tensioned strap is preferably provided with a stop member which will limit the extension elongation thereof so that its maximum dimension corresponds to the condition where the lock half of the seat belt system is engaged with a reciprocating lock half. However, it should be understood that the use of a stop or limiting means is not essential to the invention, but rather forms a preferred embodiment thereof.

The tensioned cord or strap performs several functions. A principal function which it performs is to hold the lap belt and the shoulder belt in a position above the horizontal plane of the seat. When a passenger enters a vehicle such as an automobile equipped with such a system and sits upon the seat the lap belt and shoulder belt have already completed about half of their circumvention of the passenger and all that need be done by the passenger is to complete the enclosure. By anchoring the lap belt and shoulder belt towards the center of the vehicle and away from the direction from which the passenger enters the seat the tensioned cord or strap allows free entry to the seat. However, it is extremely difficult to avoid use of this system by engaging the lock halves prior to entry upon the seat since at such position the tensioned cord or strap extends across the path of the passenger and precludes entry of the passenger upon the seat. This will be understood when reference is made to a specific embodiment of the invention.

By use of the tensioned cord or strap the shoulder belt and lap belt are stretched above the seat diagonally with respect to the longitudinal axis of the vehicle and the belt lock half is suspended higher than the top of the seat cushion. However, when the seat belt is fastened the tensioned cord or strap will be substantially parallel to the longitudinal axis of the vehicle.

While the tensioned cord or strap is generally fixed to the dashboard door frame or the corner between the dashboard and door frame in respect of a front seat it is preferably attached to the backrest of a front seat when adapted to serve a rear seat. Alternatively it can be attached to a center post of the vehicle body.

In a desirable embodiment of the invention there is located adjacent the corners formed between the dashboard and the doors a tensioned cord or strap system which operates by spring force. Alternatively it can be attached by a tensioned spring or a rubber bungee such that the pull is sufficiently strong so that when the seat belt lock is unfastened the shoulder and lap belts, which are attached to the front seat, for example, at the bottom close to the center of the width of the vehicle and, at the top, to the backrest approximate the center of the width of the vehicle. The attachment is such that the shoulder and lap belts will be stretched above diagonally above the seat upon disengagement of the lock halves. For the back seat, the cord or strap tension system is preferably attached to the backrest of the front seat adjacent the doorpost or to the doorpost itself.

As stated above, when a passenger enters the vehicle and sits upon a seat the belt half already partially surrounds him and all that he need do is to grasp the belt lock half which is approximately above his knees and continue the arc across the balance of his body and engage the lock half into the reciprocating lock half. When the belt lock is unfastened, the belt lock half will rise automatically, by use of the tensioned strap, together with the belts and permit the occupant to leave.

At the same time the belt lock half will again be in the most favorable position to permit the simple and rapid grasping and fastening of the belts. If the belt is locked while the seats are not occupied, the seats cannot be entered without difficulty for the cord or strap stretching from the dashboard and/or door corner to the belt lock will interfere with such entrance. The extensible cord or strap must therefore be able to extend or stretch so as to permit engagement of the lock halves, but it must not extend substantially further than this position of the seat belt system. Limitation of movement of the tensioned strap can be achieved by means of a stop or by means of a length limiting means. Length limitation is decisively important because it should not be possible, after the belt is fastened, to pull or stretch the cord or strap sufficiently further to enable it to be forced aside for the purpose of sitting upon the belts.

DESCRIPTION OF THE DRAWINGS

The invention can be more readily understood when reference is made to the accompanying drawings in which.

DESCRIPTION OF SPECIFIC EMBODIMENTS

Figure 1:
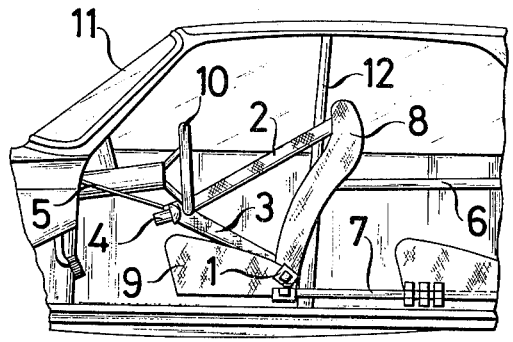
FIG. 1 is a side elevational view of the driver's seat as seen from the front door, with the seat belt unfastened.
Figure 2:
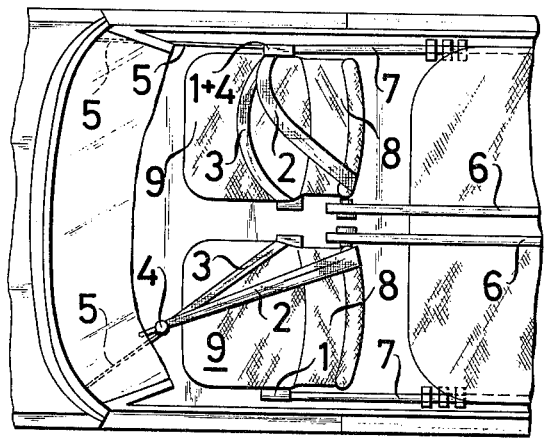
FIG. 2 is a top plan view of the front seats of a vehicle wherein the driver's seat is provided with seat belts which are unfastened and the front passenger's seat is provided with fastened seat belts.

A specific embodiment of the invention is shown in the drawings. FIG. 1 shows the front seat 9 provided with a backrest 8 and a lap belt 3. There is also provided a shoulder belt 2 and a belt lock half 4. As soon as the occupant sits on seat 9, the lap belt 3 and the shoulder belt 2 already extend almost half around him as seen in FIG. 2 bottom portion in respect of the driver's seat. The tensioned cord or strap 5 is attached to the belt lock half 4 or in the region of the juncture between the shoulder belt 2 and the lap belt 3. At the other end it is attached to the body of the car in the corner formed between the dashboard and the door. This tensioned cord or strap 5 holds the shoulder belt 2 and the lap belt 3 by means of a spring force or by means of a rubber bungee diagonally above and across the seat 9 towards the corner between the dashboard and doors. Stated differently, the shoulder belt 2 and the lap belt 3 are held above the horizontal plane of the top of seat 9 and partially across the seat partially facing the direction from which the passenger enters.

Figure 3:
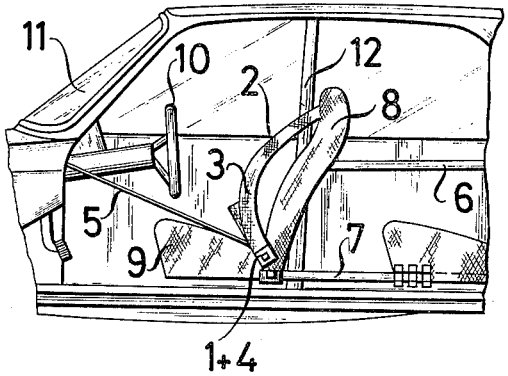
FIG. 3 is a side elevational view of the driver's seat as seen from the door side in the manner of FIG. 1 wherein the seat belts have been fastened.

The means for anchoring the shoulder belt 2 is disposed on that side of the backrest 8 to which an energy absorbing means 6 can be attached. The use of energy absorbing means 6 is, however, not required for the invention. The belt lock half 1 which engages belt lock half 4 is anchored to the seat 9 as shown in FIGS. 1 and 3. It is stabilized by an energy absorbing means such as energy absorbing means 7 on the same side of the seat.

The windshield 11, steering wheel 10 and doorpost 12 form parts of the vehicle. The front seat 9 is guided on a seat adjustment guide, as usual. In FIG. 2 there is shown an unfastened shoulder belt 2 in respect of the driver's side of the vehicle and an unfastened lap belt 3 interconnected with the shoulder belt 2 at a belt lock half 4 (lower part of the figure). The tensioned cord or strap 5 holds the shoulder belt 2 and lap belt 3 outstretched as seen in FIG. 1. Referring to the upper portion of FIG. 2 there is shown a fastened shoulder belt 2, a lap belt 3 and a belt lock 1 and 4. Here it can be seen that the tensioned cord or strap 5 runs generally longitudinal of the vehicle axis and would preclude entry upon the seat from the passenger's door. The cord or strap 5 cannot be extended or extracted substantially further than necessary for the purpose of fastening the belt locks 1 and 4.

FIG. 3 shows the same elevational view as FIG. 1 with the exception that shoulder belt 2 and lap belt 3 are fastened, the tensioned cord or strap 5 making it virtually impossible to enter the vehicle and sit upon belts 2 and 3 while the belt lock half 1 engages the belt lock half 4.

It will be realized that the embodiment of the present invention just discussed is only one of numerous embodiments which would preclude avoidance of safety belt use and which will dispose the lap belt and shoulder belt in an already partially extended position. One of skill in the art can readily make constructural changes which are nevertheless within the scope of the invention. For example, the shoulder and lap belts can also be attached to other portions of the vehicle such as the body of the vehicle itself. Instead of the tubular energy absorbing support 6 for the seat back 8 support can be provided also by means of a strap or the like.

What is claimed is:

1. In a safety belt system for use in a moving vehicle comprising a lap belt and a shoulder belt interconnected and provided with at least one lock half which lock half is engaged by a reciprocating lock half, said lap belt and shoulder belt disposed to overlie a passenger seated on a seat in said vehicle, the improvement which consists essentially of a tensioned strap connected to the vehicle at one end proximate a vehicle door and to the safety belt system at the other proximate the junction of said lap belt and said shoulder belt, said lap belt and said shoulder belt being held by said tensioned strap in facing relationship to said vehicle door above the horizontal plane of said vehicle seat when said lock halves are not engaged.

2. A safety belt system according to claim 1 wherein said tensioned strap is attached at one end to said lock half.

3. A safety belt system according to claim 1 wherein said tensioned strap is attached at one end to the vehicle body at the dashboard.

4. A safety belt system according to claim 1 wherein said tensioned strap is attached to the vehicle body at a door frame.

5. A safety belt system according to claim 1 wherein said tensioned strap is attached to the vehicle body at the corner of the dashboard and door frame.

6. A safety belt system according to claim 1 wherein when said lock half is engaged with said reciprocating lock half said tensioned strap runs generally parallel to the longitudinal axis of said vehicle 7. A safety belt system according to claim 1 wherein said safety belt system is disposed about a rear seat and said tensioned strap is fastened to the backrest of the forward seat immediately therein front.

8. A safety belt system according to claim 1 wherein said tensioned strap has a stop or limitation which prevents extension or elongation of its length beyond a fixed dimension.

9. A safety belt system according to claim 1 wherein said lap belt and said shoulder belt are anchored toward the center of said vehicle and are movable over the vehicle seat in the direction from which a passenger enters.

10. A safety belt system according to claim 1 wherein said shoulder and said lap belts are exclusively fastened to said seat or said backrest.

11. A safety belt system according to claim 10 wherein said shoulder and lap belts are exclusively fastened, at one end thereof, to said seat or said backrest.

12. A safety belt system according to claim 10 wherein said shoulder and lap belts are exclusively fastened to said seat.

13. A safety belt system according to claim 10 wherein said seat is connected to a first energy damping means, said backrest is connected to a second energy damping means, said first and second energy damping means being separate from one another, each of said damping means dampening any shock in a longitudinal direction to the car body.

14. A safety belt system according to claim 1 wherein said shoulder belt is attached at one end to said backrest, said lap belt is connected at one end to said seat and the belt lock is connected to the other end of said shoulder belt and said lap belt and is attached to said seat.

* * * * *